(12) United States Patent
Kanazirev et al.

(10) Patent No.: US 10,486,132 B2
(45) Date of Patent: Nov. 26, 2019

(54) COPPER ADSORBENT FOR GAS PURIFICATION

(71) Applicant: UOP LLC, Des Plaines, IL (US)

(72) Inventors: Vladislav I. Kanazirev, Arlington Heights, IL (US); Jayant K. Gorawara, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/954,917

(22) Filed: Apr. 17, 2018

(65) Prior Publication Data
US 2018/0229211 A1  Aug. 16, 2018

Related U.S. Application Data

(63) Continuation-in-part of application No. PCT/US2016/059255, filed on Oct. 28, 2016.

(60) Provisional application No. 62/253,417, filed on Nov. 10, 2015.

(51) Int. Cl.
    *B01J 20/02* (2006.01)
    *B01D 53/52* (2006.01)
    *B01D 53/64* (2006.01)
    *B01D 53/82* (2006.01)

(52) U.S. Cl.
    CPC .......... *B01J 20/0237* (2013.01); *B01D 53/52* (2013.01); *B01D 53/64* (2013.01); *B01D 53/82* (2013.01); *B01D 2253/10* (2013.01); *B01D 2257/304* (2013.01); *B01D 2257/308* (2013.01); *B01D 2257/553* (2013.01); *B01D 2257/602* (2013.01)

(58) Field of Classification Search
    CPC .... B01D 53/02; B01D 53/14; B01D 53/1468; B01D 53/1487; B01D 53/48; B01D 53/52; B01D 53/64; B01D 2252/10; B01D 2253/112; B01D 2253/1124; B01D 2257/304; B01D 2257/306; B01D 2257/60; B01D 2257/602; B01D 2258/0283; B01J 20/0233; B01J 2220/42; B01J 20/0237; C10K 1/003; C10K 1/004; C10K 1/007; C10K 1/20
    See application file for complete search history.

(56) References Cited

U.S. PATENT DOCUMENTS

| | | |
|---|---|---|
| 4,612,177 A | 9/1986 | Kretchmer et al. |
| 6,124,517 A | 9/2000 | Kaminsky et al. |
| 7,323,151 B2 | 1/2008 | Hansen |
| 7,393,993 B1 | 7/2008 | Kanazirev et al. |
| 7,645,306 B2 | 1/2010 | Kanazirev |
| 8,282,707 B2 | 10/2012 | Bresler et al. |
| 8,313,641 B2 | 11/2012 | Kanazirev et al. |
| 8,314,281 B2 | 11/2012 | Kanazirev et al. |
| 8,609,048 B1 | 12/2013 | Beadle et al. |
| 2003/0113598 A1 | 6/2003 | Chow et al. |
| 2010/0012578 A1 | 1/2010 | Kanazirev et al. |
| 2013/0047850 A1 | 2/2013 | Kanazirev et al. |
| 2013/0202510 A1* | 8/2013 | Kanazirev ............... B01J 20/046 423/230 |
| 2013/0202511 A1* | 8/2013 | Kanazirev ............ C10G 25/003 423/230 |
| 2018/0245006 A1* | 8/2018 | Kanazirev ............ C10G 25/003 |

FOREIGN PATENT DOCUMENTS

| | | |
|---|---|---|
| CN | 103372369 | 10/2013 |
| WO | 2008023051 A1 | 2/2008 |
| WO | 2012084871 | 6/2012 |
| WO | 2013119359 A1 | 8/2013 |

OTHER PUBLICATIONS

Extended European Search report from corresponding European application No. 16864774.1, dated Apr. 25, 2019.
Written Opinion from corresponding PCT application No. PCT/US2016/059255, dated Jan. 9, 2017.
International Search Report from corresponding PCT application No. PCT/US2016/059255, dated Feb. 9, 2017.
International Preliminary Report on Patentability from corresponding PCT application No. PCT/US2016/059255, dated May 15, 2018.
Quinn, et al., "Removal of arsine from synthesis gas using a copper on carbon adsorbent", Industrial and Engineering Chemistry Research (2006), v 45, n 18, p. 6272-6278.
Husmann, et al., "Evaluation of sorbents for high temperature in situ desulfurization of biomass-derived syngas", Energy and Fuels (2014), v 28, n 4, p. 2523-2534.
Li et al., "Metal-based adsorbents for regenerable deep desulfurization of warm syngas", 25th Annual International Pittsburgh Coal Conference, (2008), ISBN-10: 189097725X, ISBN-13: 9781890977252.
Ko, et al., "The sorption of hydrogen sulfide from hot syngas by metal oxides over supports", Chemosphere (2005), v 58, n 4, p. 467-474.
Cheah, et al., "Manganese and ceria sorbents for high temperature sulfur removal from biomass-derived syngas—The impact of steam on capacity and sorption mode", Fuel (2012), v 97, p. 612-620.

(Continued)

*Primary Examiner* — Timothy C Vanoy

(57) ABSTRACT

Copper adsorbents which are resistant to the reduction by the components of the synthesis gas at normal operation conditions. The adsorbents are produced by admixing small amounts of an inorganic halide, such as NaCl, to the basic copper carbonate precursor followed by calcination at a temperature sufficient to decompose the carbonate. The introduction of the halide can be also achieved during the forming stage of adsorbent preparation. These reduction resistant copper oxides can be in the form of composites with alumina and are especially useful for purification of synthesis gas and the removal of mercury, arsine, phosphine, as well as hydrogen sulfide.

20 Claims, 2 Drawing Sheets

(56) References Cited

OTHER PUBLICATIONS

Figure 1:
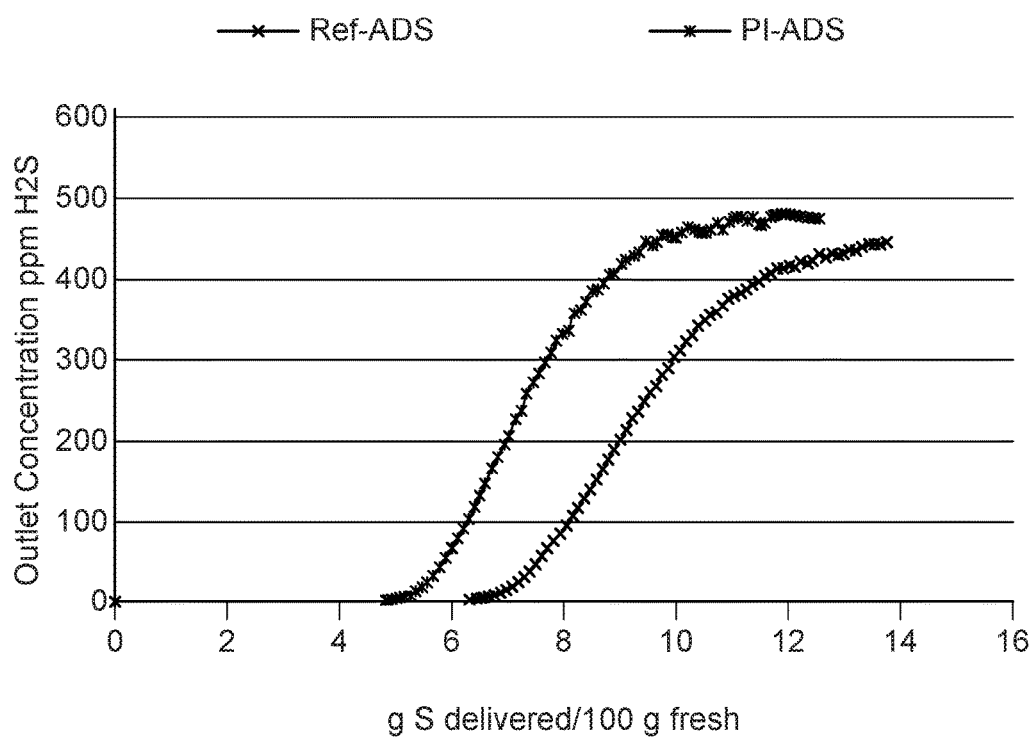

Wang et al., "Simultaneous removal of hydrogen sulfide and mercury from simulated syngas by iron-based sorbents", Fuel (2013), v 103, p. 73-79.
Sharma et al., "A critical review of syngas cleaning technologies—fundamental limitations and practical problems", Powder Technology (2008), v 180, p. 115-121.
Woolcock et al., "A review of cleaning technologies for biomass-derived syngas", Biomass and bio energy (2013), v 52 p. 54-84.
Sharma et al., "Recent developments in dry hot syngas cleaning processes", Fuel (2010), v 89, p. 817-826.

* cited by examiner

COPPER ADSORBENT FOR GAS PURIFICATION

CROSS-REFERENCE TO RELATED APPLICATIONS

This application is a Continuation-In-Part of copending International Application No. PCT/US2016/059255 filed Oct. 28, 2016, which application claims priority from U.S. Provisional Application No. 62/253,417 filed Nov. 10, 2015, now expired, the contents of which cited applications are hereby incorporated by reference in their entirety.

FIELD OF THE INVENTION

This invention relates generally to adsorbents for removing various contaminants from gaseous streams and more particularity to copper based sorbents used to remove contaminants from various gaseous streams, and particularly from syngas streams.

BACKGROUND OF THE INVENTION

Copper-containing sorbents play a major role in the removal of contaminants, such as sulfur compounds and metal hydrides, from gas and liquid streams, such as synthesis gas. The active copper phase for the removal of sulfur compounds from synthesis gas can be derived from copper compounds, mainly in carbonate, oxide and hydroxide form or mixtures thereof. Copper adsorbents for synthesis gas are usually porous solids with well-developed pore structure and appreciable surface area. Inorganic supports or binders can be used to provide physical stability and durability at the process conditions of synthesis gas purification.

The term synthesis gas designates mixtures of carbon monoxide (CO) and hydrogen ($H_2$) in varying proportion which often contain carbon dioxide ($CO_2$), and water ($H_2O$). The most typical process of synthesis gas production consists of high temperature reforming of natural gas or other hydrocarbon feeds. The synthesis gas is then fed to different catalytic processes such as low and high temperature water shift reactions which are susceptible to catalytic poisons, mainly hydrogen sulfide ($H_2S$) and carbonyl sulfide (COS).

Synthesis gas may be produced from various processes. For example, copper containing catalysts are widely used to catalyze the low temperature water shift reaction in which carbon monoxide is reacted in presence of steam to make carbon dioxide and hydrogen. Copper catalysts are also used in the synthesis of methanol and higher alcohols. Producing synthesis gas from coal is another commercial technology. In such processes the product stream contains a range of contaminants, with arsine ($AsH_3$) being the most detrimental for the catalytic process downstream. A typical raw synthesis gas stream contains approximately 0.5 to 1.0 ppm arsine. Coal derived synthesis gas may in some instances contain mercury and heavy metals as contaminants.

Synthesis gas requires frequently adding hydrogen sulfide in order to prevent metal dusting corrosion which is known to occur at temperatures over 300° C. (572° F.). However, hydrogen sulfide is poisonous to the downstream catalysts and needs to be removed at a level of approximately 20 ppb or less. Thus, synthesis gas typically contains various contaminants such as hydrogen sulfide, arsine, and mercury.

It is known to use copper containing adsorbents to remove the hydrogen sulfide from synthesis gas. For example, U.S. Pat. No. 7,323,151 discloses such an adsorbent. Unfortunately, the reducing agents contained in the synthesis gas, such as carbon monoxide and hydrogen gas, can trigger the reduction of the oxide to the copper metal which is less suited for removal of other contaminants such as arsine and mercury. A further detriment to the reduction process is that heat is liberated which may result in runaway reactions and other safety concerns in the process.

The presence of cupric oxide (CuO) is important so that, in the presence of hydrogen sulfide, the cupric oxide can form cupric sulfide (CuS). The cupric sulfide is desirable for its ability to remove mercury.

Thus, easily reducible cupric oxide is disadvantageous in the purification of synthesis gas. Again, the removal of some hydrogen sulfide from gas streams at elevated temperatures is based on the reaction of cupric oxide with hydrogen sulfide. Thermodynamic analysis shows that this reaction results in a low equilibrium concentration of hydrogen sulfide in the product gas even at temperatures in excess of 300° C. (572° F.). The residual hydrogen sulfide concentration in the product gas is much higher (which is undesirable) when cupric oxide reduces to copper metal in the course of the process since the reaction, below, is less favored than cupric oxide sulfidation to cupric sulfide:

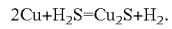

$$2Cu+H_2S=Cu_2S+H_2.$$

Combinations of cupric oxide with other metal oxides are known to retard reduction of cupric oxide. However, this is an expensive option that lacks efficiency due to performance loss caused by a decline of the surface area and the lack of availability of the cupric oxide active component. The known approaches to reduce the reducibility of the supported cupric oxide materials are based on combinations with other metal oxides such as chromium (III) oxide ($Cr_2O_3$). The disadvantages of the approach of using several metal oxides are that it complicates the manufacturing of the sorbent because of the need of additional components, production steps and high temperature to prepare the mixed oxides phase. As a result, the surface area and dispersion of the active component strongly diminish, which leads to performance loss. Moreover, the admixed oxides are more expensive than the basic cupric oxide component which leads to an increase in the sorbent's overall production cost. Accordingly, in spite of the aforementioned shortcomings associated with using copper metal adsorbents, such as in U.S. Pat. No. 7,323,151, these adsorbents remain one of the most commonly used adsorbents for removing hydrogen sulfide.

Therefore it would be desirable to have an adsorbent that is capable of effectively and efficiently removing multiple contaminants from the synthesis gas. Accordingly, the present invention is intended to solve one or more of these problems.

SUMMARY OF THE INVENTION

It has been found that calcination of intimately mixed solid mixtures of basic copper carbonate (abbreviated herein as "BCC") and halide salt powder led to a material that was more difficult to reduce than the one prepared from BCC in absence of any salt powder that can be used to remove contaminants from gas streams containing reducing agents like hydrogen and carbon monoxide. It was discovered that the presence of the reducing agents in the synthesis gas can surprisingly provide a copper sorbent that includes copper metal, as well as both cupric oxide and cuprous oxide. The resultant sorbent can be used to remove contaminants such as mercury, arsenic, phosphorous, and sulfur compounds from a liquid or gas stream, such as a syngas stream, that includes hydrogen gas. It was also discovered that such reduction of the copper carbonate occurs at surprisingly low temperatures, allowing the sorbents to be used much more readily at start up process conditions compared to conventional sorbents which require additional pretreatment steps.

Therefore, in a first aspect of the present invention, the present invention may be characterized broadly as providing a process for removing contaminants from a stream by: contacting a stream with a sorbent in a contaminant removal zone, wherein the sorbent comprises copper, cupric oxide, cuprous oxide, and a halide, the stream comprising at least hydrogen and including one or more contaminants selected from the group consisting of mercury, arsenic, phosphine and sulfur compounds; and, selectively removing one or more of the contaminants from the stream to provide a purified stream.

The sorbent may further comprise a porous support material selected from the group consisting of alumina, silica, silica-aluminas, silicates, aluminates, silico-aluminates, zeolites, titania, zirconia, hematite, ceria, magnesium oxide, and tungsten oxide. The porous support material comprises a transition alumina formed by the flash calcination of aluminum hydroxide.

The stream may comprise a stream of synthesis gas.

The sorbent may comprise from approximately 1 to approximately 35 wt % copper, and from approximately 45 to approximately 75% of the copper in the sorbent may comprise cuprous oxide.

The sorbent may comprise from approximately 0.05 to approximately 2 wt % of the halide.

In a second aspect of the present invention, the present invention may be characterized broadly as providing a process for removing contaminants from a stream by: passing a stream to a contaminant removal zone, the stream comprising at least hydrogen and including one or more contaminants selected from the group consisting of mercury, arsenic, phosphine and sulfur compounds and the contaminant removal zone comprising a sorbent configured to selectively remove one or more contaminants from the stream, wherein the sorbent comprises copper, cupric oxide, cuprous oxide, and a halide; and, recovering a purified stream from the contaminant removal zone.

The process may further comprise loading pristine sorbent into the contaminant removal zone before the stream comprising at least hydrogen is passed to the contaminant removal zone. The pristine sorbent may be reduced when the pristine sorbent is loaded into the contaminant removal zone. Further, the pristine sorbent may be reduced in the contaminant removal zone with hydrogen from the stream comprising hydrogen. The stream comprising at least hydrogen may be passed to the contaminant removal zone after the pristine sorbent is loaded into the contaminant removal zone without any further reduction of the sorbent. The stream comprising at least hydrogen is passed to the contaminant removal zone after the pristine sorbent is loaded into the contaminant removal zone without any drying of the sorbent.

The sorbent may comprise from approximately 0.05 to approximately 2 wt % of the halide.

The sorbent may further comprise a porous support material selected from the group consisting of alumina, silica, silica-aluminas, silicates, aluminates, silico-aluminates, zeolites, titania, zirconia, hematite, ceria, magnesium oxide, and tungsten oxide.

The sorbent may comprise from approximately 1 to approximately 35 wt % copper, and from approximately 45 to approximately 75% of the copper in the sorbent may comprise cuprous oxide.

The sorbent may be at least partially sulfided.

In a third aspect of the present invention, the present invention may be characterized broadly as providing a process for removing contaminants from a stream by: forming a sorbent from a mixture of a porous support, a basic copper carbonate, and a halide material; activating the sorbent such that the sorbent comprises copper, cupric oxide, and cuprous oxide; loading the sorbent into a contaminant removal zone after the sorbent has been activated; and, passing a stream comprising at least hydrogen to the contaminant removal zone configured to remove at least one contaminant selected from the group consisting of mercury, arsenic, phosphine and sulfur compounds (such as hydrogen sulfide and carbonyl sulfide) from the stream and provide a purified stream.

The sorbent may comprise a plurality of particles and at least some of the particles have a 7×8 mesh size. The particles may comprise porous beads with a bulk density from 640 kg/nr to 1280 kg/nr. The sorbent may comprise from approximately 1 to approximately 35 wt % copper, and from approximately 45 to approximately 75% of the copper in the sorbent may comprise cuprous oxide.

Additional aspects, embodiments, and details of the invention, all of which may be combinable in any manner, are set forth in the following detailed description of the invention.

DETAILED DESCRIPTION OF THE DRAWINGS

Figure 2:
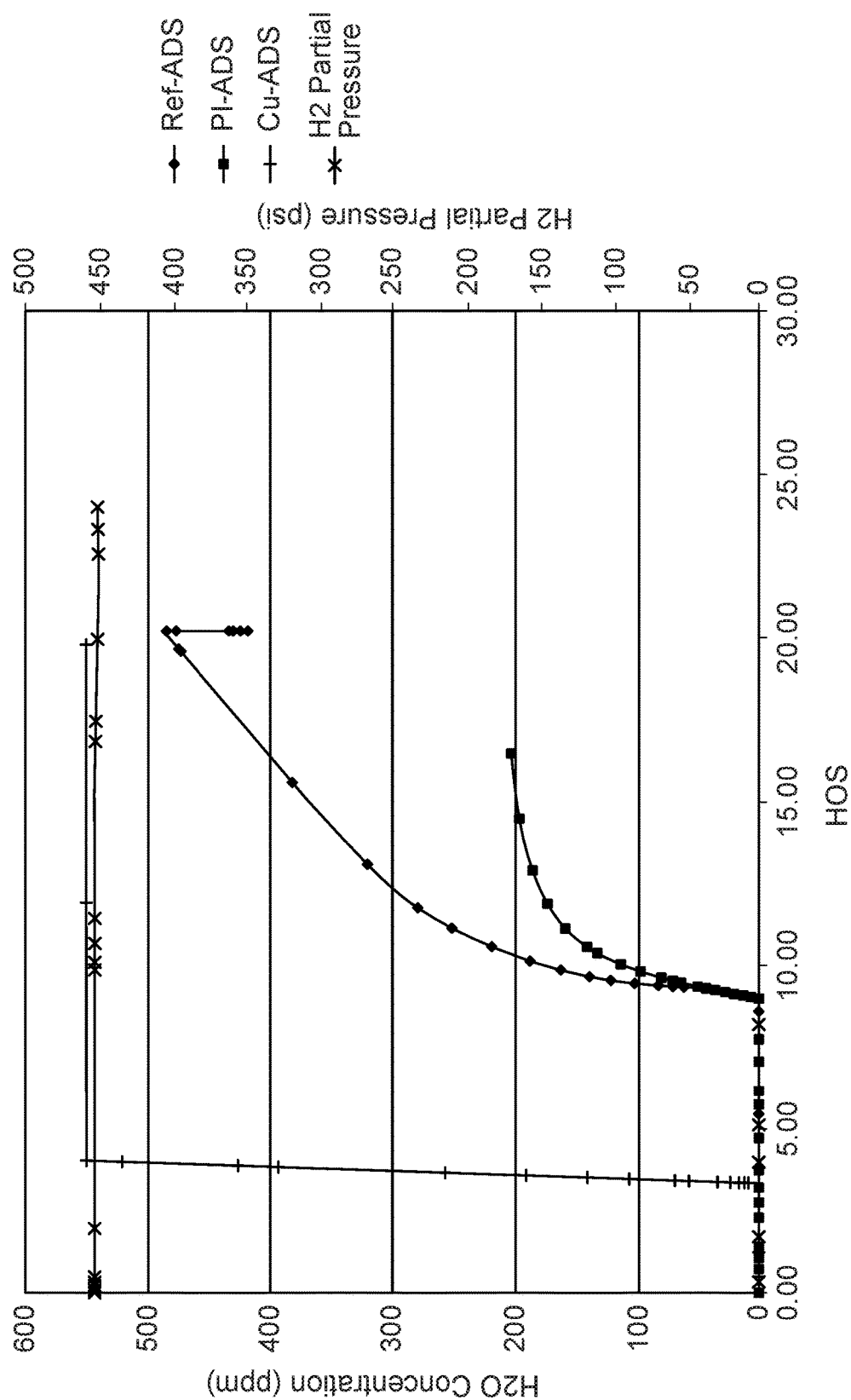

One or more exemplary embodiments of the present invention will be described below in conjunction with the following drawing figures, in which:

FIG. 1 shows a graphical comparison of the ambient temperature hydrogen sulfide capacity for a sorbent produced according to the present invention and a sorbent having the same level of copper produced according to prior art processes; and, FIG. 2 shows a graphical comparison of the water production for a sorbent produced according to the present invention and sorbents produced according to prior art processes.

DETAILED DESCRIPTION OF THE INVENTION

As mentioned above, the present invention provides various processes for removing contaminants from hydrogen containing gas streams using copper adsorbents, in particular sorbents containing copper metal, cupric oxide and cuprous oxide supported on a porous carrier wherein the adsorbent is resistant to cupric and cuprous oxide reduction. In contrast to the current technologies, the sorbent is pre-reduced to a condition of having copper phases in different oxidation states. Accordingly while the sorbents of the prior art and the sorbents of the present invention may have the same active components, the presence of the oxidized copper in the sorbents of the present invention will act to lower the ability of the active copper to be reduced to copper metal and copper oxides. Thus, when the sorbent is loaded in to a bed, it has already been reduced and does not require further reduction via hydrogen gas, for example, even though the sorbents contains copper metal. The presence of oxidized copper such as cupric oxide and cuprous oxide enhance the driving force and the efficiency for removing contaminants such as arsine, phosphine, carbonyl sulfide, hydrogen sulfide and mercury compounds to low ppb levels.

In the present invention, a sorbent may be produced by combining an inorganic halide with a basic copper carbonate to produce a mixture and then the mixture is calcined for a sufficient period of time to decompose the basic copper carbonate into various phases of oxidation. It has been found that curing and activation at temperatures not exceeding 165° C. (329° F.) will provide the sorbent with the preferred composition. This temperature allows for the controlled formation of cuprous oxide without over reduction of the metal. Due to the temperature of activation, less than 165° C. (329° F.), the majority of the copper is preferably cuprous oxide. A minimum activation temperature of 40° C. (104° F.) may be used with the appropriate processing conditions, particularly if the partial pressure of the reducing gas(es) exceeds approximately 3.4 MPag (500 psig) and the sorbent is treated for approximately 10 hours.

Preferably the sorbents comprises from approximately 1 to 35 weight percent (wt %) total copper (i.e., in all forms). Throughout this application, the amount of total copper by weight percent is calculated as elemental copper. By "approximately" it is meant that value includes +/−5%, or +/−2%, or +/−1%. In at least one embodiment, approximately 22 wt % of the sorbents comprise cuprous oxide, such that cuprous oxide comprises from approximately 45 to approximately 75%, or from approximately 55 to approximately 65%, or more than 50% of the total copper in the sorbent.

The sorbent may be prepared via a known procedure of co-nodulizing. For example, approximately 40% basic Cu carbonate (BCC) and 60% flash calcined alumina (FCA) may be co-formed in a water sprayed rotating pan. An alkali metal halide, such as NaCl or the like, is sprayed into the pan to produce particles. In at least one embodiment, the particles have a 7×8 mesh size, or a 5×7 mesh size, and comprise porous beads with a bulk density from 640 kg/nr (40 lbs/ft$^3$) to 1280 kg/nr (80 lbs/ft$^3$). However, other sizes may be used depending on the use. The resultant particles are cured and activated at temperatures not exceeding 165° C. (329° F.). The sorbent may also be sulfided, or partially sulfided, which is particularly desirable when a high efficiency mercury removal at startup of the process is required.

Another way to practice the invention is to mix solid chloride salt and metal oxide precursor (carbonate in this case) and to subject the mixture to calcinations to achieve conversion to oxide. Prior to the calcinations, the mixture can be co-formed with a carrier such as porous alumina. The formation process can be done by extrusion, pressing pellets or nodulizing in a pan or drum nodulizer.

Various forms of basic copper carbonate may be used with a preferred form being synthetic malachite, $CuCO_3 \cdot Cu(OH)_2$. Basic copper carbonates such as $CuCO_3 \cdot Cu(OH)_2$ can be produced by precipitation of copper salts, such as $Cu(NO)_3$, $CuSO_4$ and $CuCl_2$, with sodium carbonate. Depending on the conditions used, and especially on washing the resulting precipitate, the final material may contain some residual product from the precipitation process. In the case of the $CuCl_2$ raw material, sodium chloride is a side product of the precipitation process. It has been determined that a commercially available basic copper carbonate that had both residual chloride and sodium, exhibited lower stability towards heating and improved resistance towards reduction than another commercial BCC that was practically chloride-free.

To produce the sorbents according to the present invention, agglomerates may be formed which comprise a support material, copper oxides, copper metal and halide salts. The support material is preferably a porous support material and may be selected from the group consisting of alumina, silica, silica-aluminas, silicates, aluminates, silico-aluminates, zeolites, titania, zirconia, hematite, ceria, magnesium oxide, and tungsten oxide. The alumina is typically present in the form of transition alumina which comprises a mixture of poorly crystalline alumina phases such as "rho", "chi" and "pseudo gamma" aluminas which are capable of quick rehydration and can retain substantial amount of water in a reactive form. An aluminum hydroxide $Al(OH)_3$, such as Gibbsite, is a source for preparation of transition alumina. The typical industrial process for production of transition alumina includes milling Gibbsite to 1 to 20 microns particle size followed by flash calcination for a short contact time as described in the patent literature such as in U.S. Pat. No. 2,915,365. Amorphous aluminum hydroxide and other naturally found mineral crystalline hydroxides e.g., Bayerite and Nordstrandite or monoxide hydroxides (AlOOH) such as Boehmite and Diaspore can be also used as a source of transition alumina.

The sorbent that contains the halide salt exhibits a higher resistance to reduction than does a similar sorbent that is made without the halide salt. The preferred inorganic halides are sodium chloride, potassium chloride or mixtures thereof. Bromide salts are also effective. The chloride content in the copper oxide sorbent may range from 0.05 to 2.5 wt %.

The sorbents can be used to remove various contaminants, such as hydrogen sulfide, carbonyl sulfide, arsine and phosphine, from a stream at nearly ambient temperature. It is believed that one particular advantageous use of the sorbents is with a synthesis gas stream. Typically, the synthesis gas contain 68% hydrogen gas, 23% carbon monoxide, 5% carbon dioxide and 4% nitrogen gas at a pressure of approximately 51,711 kPa (7,500 psig) and GHSV (gas hourly space velocity) of 3,000 to 7,000 hr$^{-1}$. The adsorbent according the present invention would resist the reduction of cuprous oxide and cupric oxide by the hydrogen and carbon monoxide gases.

Additionally, the sorbents according to the present invention have a low heat generation and low water evolution in the presence of hydrogen gas at temperatures below 50° C. (122° F.) in lab testing. This eliminates a major disadvantage of the copper based sorbents at startup in which the non-modified copper carbonate can easily reduce to copper metal at temperatures from 45 to 55° C. (113 to 131° F.).

Unlike sorbents which only contain metal obtained by pre-reduced copper oxide, the sorbents according to the present invention will, without any further pretreatment or loading steps remove hydrogen sulfide from the stream by the following reactions:

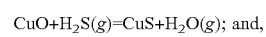
$CuO+H_2S(g)=CuS+H_2O(g)$; and,

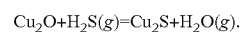
$Cu_2O+H_2S(g)=Cu_2S+H_2O(g)$.

Additionally, in addition converting mercaptans to disulfides, the sorbents according to the present invention also remove mercaptans by reaction with the cuprous oxide:

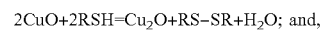
$2CuO+2RSH=Cu_2O+RS-SR+H_2O$; and,

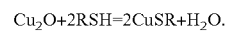
$Cu_2O+2RSH=2CuSR+H_2O$.

A comparison between a sorbent according to the present invention (PI-ADS), and a copper sorbent produced with an activation temperature above the 165° C. (329° F.) (Ref- ADS) is shown in FIG. 1. The test was conducted in a flow reactor with nitrogen containing approximately 500 ppm hydrogen sulfide.

The PI-ADS was additionally treated off site in a flow of hydrogen gas at temperatures from 40 to 150° C. (104 to 302° F.) to simulate the reducing atmosphere encountered in a synthesis gas application. This treatment led to a partial reduction of the copper in the sorbent resulting in a sorbent having a mixture of copper phases, namely, copper metal, cuprous oxide, and cupric oxide. The copper phase composition was verified by X-ray analysis. In contrast, the Ref-ADS contained only the cupric oxide copper phase produced by thermal decomposition of the copper carbonate precursor at temperatures above 165° C. (329° F.) in the activation process.

FIG. 1 shows that the sorbent according to the present invention (PI-ADS) had only a slightly lower capacity for hydrogen sulfide adsorption. This is an expected outcome since the content of the cupric oxide, which is the most potent phase in the hydrogen sulfide removal process, is smaller in the sorbent according to the present invention (PI-ADS), but fully adequate for the complex synthesis gas purification involving a variety of contaminants. It is expected that the sulfur capacity can be increased with a higher amount of copper in the PI-ADS sorbent.

FIG. 2 shows the results of another test in which the sorbentg according to the present invention (PI-ADS) produced less water when exposed to high hydrogen partial pressures (approximately 3,100 kPa (450 psi)), at 40° C. (104° F.) in a flow reactor. The copper sorbent produced with an activation temperature above the 165° C. (329° F.) (Ref-ADS), which also contained a chloride additive, showed significantly larger water evolution while a standard cupric oxide sorbent (Cu-ADS) that did not contain a chloride additive demonstrated massive water evolution even at a shorter time on stream.

The behavior of the sorbents according to the present invention (PI-ADS) is beneficial in many ways. Besides the lower water evolution, which is undesirable in the stages of final purification of the synthesis gas, there is much less heat generated in the reduction process and better opportunity to control the process and avoid runaway exothermic reactions. The X-ray analysis of the materials after the test confirms the presence of oxide phases in PI-ADS which is beneficial for removal of other contaminants such as arsine and phosphine from the synthesis gas.

Accordingly, in at least one aspect of the present invention, a bed in a vessel within a contaminant removal zone can be loaded with sorbent according to the present invention. The pristine sorbent may be loaded into the contaminant removal zone before the stream comprising at least hydrogen is passed to the contaminant removal zone. A stream, having a reducing agent, such as hydrogen or carbon monoxide, can be passed into the contaminant removal zone. No further steps of reduction of the sorbent are required, and upon startup may begin immediately processing the stream. Rather, hydrogen from the stream comprising hydrogen may reduce the pristine sorbent in the contaminant removal zone. Additionally, the stream comprising at least hydrogen may be passed to the contaminant removal zone after the pristine sorbent is loaded into the contaminant removal zone without the sorbent being subjected to any drying processing. Again, the stream comprising at least hydrogen can be syngas, however, other gaseous streams, and liquid streams may also be used. The sorbent removes one or more contaminants from the stream to provide a purified stream. After some time, the sorbent may be removed from the bed, and replaced with pristine, i.e., unused, sorbent, and the vessel may be placed back into service—with the stream being passed thereto without any further steps of reduction of the sorbent.

When placed in service the invented solution will provide savings not only in shortening and simplifying the startup of the unit but also in increased capacity. For new units the invented solution will allow for designing smaller beds and substantial savings.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for removing contaminants from a stream, the process comprising contacting a stream with a sorbent in a contaminant removal zone, wherein the sorbent comprises copper, cupric oxide, cuprous oxide, and a halide, the stream comprising at least hydrogen and including one or more contaminants selected from the group consisting of mercury, arsenic, phosphine and sulfur compounds; and, selectively removing one or more of the contaminants from the stream to provide a purified stream. An embodiment of the invention is one, any or all of prior embodiments in this paragraph up through the first embodiment in this paragraph wherein the sorbent further comprises a porous support material selected from the group consisting of alumina, silica, silica-aluminas, silicates, aluminates, silico-aluminates, zeolites, titania, zirconia, hematite, ceria, magnesium oxide, and tungsten oxide. An embodiment of the invention is one, any or all of prior embodiments in this paragraph up through the first embodiment in this paragraph wherein the porous support material comprises a transition alumina formed by the flash calcination of aluminum hydroxide. An embodiment of the invention is one, any or all of prior embodiments in this paragraph up through the first embodiment in this paragraph, wherein the stream comprises a stream of synthesis gas. An embodiment of the invention is one, any or all of prior embodiments in this paragraph up through the first embodiment in this paragraph, wherein the sorbent comprises from approximately 1 to approximately 35 wt % copper. An embodiment of the invention is one, any or all of prior embodiments in this paragraph up through the first embodiment in this paragraph, wherein the cuprous oxide comprises from approximately 45 to approximately 75% of the copper in the sorbent. An embodiment of the invention is one, any or all of prior embodiments in this paragraph up through the first embodiment in this paragraph, wherein the sorbent comprises from approximately 0.05 to approximately 2 wt % of the halide.

A second embodiment of the invention is a process for removing contaminants from a stream, the process comprising passing a stream to a contaminant removal zone, the stream comprising at least hydrogen and including one or more contaminants selected from the group consisting of mercury, arsenic, phosphine and sulfur compounds and the contaminant removal zone comprising a sorbent configured to selectively remove one or more contaminants from the stream, wherein the sorbent comprises copper, cupric oxide, cuprous oxide, and a halide; and, recovering a purified stream from the contaminant removal zone. An embodiment of the invention is one, any or all of prior embodiments in this paragraph up through the second embodiment in this paragraph further comprising loading pristine sorbent into the contaminant removal zone before the stream comprising at least hydrogen is passed to the contaminant removal zone. An embodiment of the invention is one, any or all of prior embodiments in this paragraph up through the second embodiment in this paragraph further comprising reducing the pristine sorbent in the contaminant removal zone with hydrogen from the stream comprising hydrogen. An embodiment of the invention is one, any or all of prior embodiments in this paragraph up through the second embodiment in this paragraph wherein the stream comprising at least hydrogen is passed to the contaminant removal zone after the pristine sorbent is loaded into the contaminant removal zone without any drying of the sorbent. An embodiment of the invention is one, any or all of prior embodiments in this paragraph up through the second embodiment in this paragraph wherein the sorbent comprises from approximately 0.05 to 2 wt % of the halide. An embodiment of the invention is one, any or all of prior embodiments in this paragraph up through the second embodiment in this paragraph wherein the sorbent further comprises a support material selected from the group consisting of alumina, silica, silica-aluminas, silicates, aluminates, silico-aluminates, zeolites, titania, zirconia, hematite, ceria, magnesium oxide, and tungsten oxide. An embodiment of the invention is one, any or all of prior embodiments in this paragraph up through the second embodiment in this paragraph, wherein the sorbent comprises from approximately 1 to approximately 35 wt % copper. An embodiment of the invention is one, any or all of prior embodiments in this paragraph up through the second embodiment in this paragraph, wherein the cuprous oxide comprises from approximately 45 to approximately 75% of the copper in the sorbent. An embodiment of the invention is one, any or all of prior embodiments in this paragraph up through the second embodiment in this paragraph, wherein the sorbent is at least partially sulfided.

A third embodiment of the invention is a process for removing contaminants from a stream, the process comprising forming a sorbent from a mixture of a porous support, a basic copper carbonate, and a halide material; activating the sorbent such that the sorbent comprises copper, cupric oxide, and cuprous oxide; loading the sorbent into a contaminant removal zone after the sorbent has been activated; passing a stream comprising at least hydrogen to the contaminant removal zone configured to remove at least one contaminant selected from the group consisting of mercury, arsenic, phosphine and sulfur compounds from the stream and provide a purified stream. An embodiment of the invention is one, any or all of prior embodiments in this paragraph up through the third embodiment in this paragraph wherein the sorbent comprises a plurality of particles and at least some of the particles have a 7×8 mesh size. An embodiment of the invention is one, any or all of prior embodiments in this paragraph up through the third embodiment in this paragraph wherein the particles comprises porous beads with a bulk density from 640 kg/nr to 1280 kg/nr. An embodiment of the invention is one, any or all of prior embodiments in this paragraph up through the third embodiment in this paragraph, wherein the sorbent comprises from approximately 1 to approximately 35 wt % copper and wherein the cuprous oxide comprises from approximately 45 to approximately 75% of the copper in the sorbent.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for removing contaminants from a stream, the process comprising:
   contacting a stream with a sorbent in a contaminant removal zone, wherein the sorbent comprises copper, cupric oxide, cuprous oxide, and a halide, the stream comprising at least hydrogen and including one or more contaminants selected from a group consisting of mercury, arsenic, phosphine and sulfur compounds; and, selectively removing one or more of the contaminants from the stream to provide a purified stream.

2. The process of claim 1 wherein the sorbent further comprises a porous support material selected from a group consisting of alumina, silica, silica-aluminas, silicates, aluminates, silico-aluminates, zeolites, titania, zirconia, hematite, ceria, magnesium oxide, and tungsten oxide.

3. The process of claim 2 wherein the porous support material comprises a transition alumina formed by a flash calcination of aluminum hydroxide.

4. The process of claim 1, wherein the stream comprises a stream of synthesis gas.

5. The process of claim 1, wherein the sorbent comprises from approximately 1 to approximately 35 wt % copper.

6. The process of claim 1, further comprising at least one of:
sensing at least one parameter of the process and generating a signal or data from the sensing;
generating and transmitting a signal; or
generating and transmitting data.

7. The process of claim 1, wherein the sorbent comprises from approximately 0.05 to approximately 2 wt % of the halide.

8. A process for removing contaminants from a stream, the process comprising:
passing a stream to a contaminant removal zone, the stream comprising at least hydrogen and including one or more contaminants selected from a group consisting of mercury, arsenic, phosphine and sulfur compounds and the contaminant removal zone comprising a sorbent configured to selectively remove one or more contaminants from the stream, wherein the sorbent comprises copper, cupric oxide, cuprous oxide, and a halide; and,
recovering a purified stream from the contaminant removal zone.

9. The process of claim 8 further comprising loading pristine sorbent into the contaminant removal zone before the stream comprising at least hydrogen is passed to the contaminant removal zone.

10. The process of claim 9 further comprising reducing the pristine sorbent in the contaminant removal zone with hydrogen from the stream comprising hydrogen.

11. The process of claim 10 wherein the stream comprising at least hydrogen is passed to the contaminant removal zone after the pristine sorbent is loaded into the contaminant removal zone without drying the sorbent.

12. The process of claim 8 wherein the sorbent comprises between approximately 0.05 to 2 wt % of the halide.

13. The process of claim 8 wherein the sorbent further comprises a support material selected from a group consisting of alumina, silica, silica-aluminas, silicates, aluminates, silico-aluminates, zeolites, titania, zirconia, hematite, ceria, magnesium oxide, and tungsten oxide.

14. The process of claim 8, wherein the sorbent comprises from 1 to 35 wt % total copper.

15. The process of claim 14, wherein the cuprous oxide comprises from approximately 45 to approximately 75% of the copper in the sorbent.

16. The process of claim 8, wherein the sorbent is at least partially sulfided.

17. A process for removing contaminants from a stream, the process comprising:
forming a sorbent from a mixture of a porous support, a basic copper carbonate, and a halide material;
activating the sorbent such that the sorbent comprises copper, cupric oxide, and cuprous oxide;
loading the sorbent into a contaminant removal zone after the sorbent has been activated;
passing a stream comprising at least hydrogen to the contaminant removal zone configured to remove at least one contaminant selected from a group consisting of mercury, arsenic, phosphine and sulfur compounds from the stream and provide a purified stream 18. The process of claim 17 wherein the sorbent comprises a plurality of particles and at least some of the particles have a 7×8 mesh size.

19. The process of claim 18 wherein the particles comprises porous beads with a bulk density between 640 kg/nr to 1280 kg/nr.

20. The process of claim 18, wherein the sorbent comprises between 1 to 35 wt % total copper and from approximately 45 to approximately 75% of the copper in the sorbent comprises cuprous oxide.

* * * * *